United States Patent
Li et al.

(10) Patent No.: US 12,065,573 B2
(45) Date of Patent: Aug. 20, 2024

(54) PHOTOCURABLE COMPOSITION

(71) Applicant: CANON KABUSHIKI KAISHA, Tokyo (JP)

(72) Inventors: Fei Li, Austin, TX (US); Weijun Liu, Cedar Park, TX (US)

(73) Assignee: CANON KABUSHIKI KAISHA, Tokyo (JP)

( * ) Notice: Subject to any disclaimer, the term of this patent is extended or adjusted under 35 U.S.C. 154(b) by 481 days.

(21) Appl. No.: 16/944,825

(22) Filed: Jul. 31, 2020

(65) Prior Publication Data
US 2022/0033665 A1    Feb. 3, 2022

(51) Int. Cl.
| | |
|---|---|
| C09D 11/101 | (2014.01) |
| B41J 2/01 | (2006.01) |
| B41M 5/00 | (2006.01) |
| C09D 11/107 | (2014.01) |
| C09D 11/38 | (2014.01) |

(52) U.S. Cl.
CPC .............. C09D 11/101 (2013.01); B41J 2/01 (2013.01); B41M 5/0023 (2013.01); C09D 11/107 (2013.01); C09D 11/38 (2013.01)

(58) Field of Classification Search
CPC ..... C09D 11/101; C09D 11/107; C09D 11/38; B41J 2/01; B41M 5/0023
See application file for complete search history.

(56) References Cited

U.S. PATENT DOCUMENTS

| | | | |
|---|---|---|---|
| 6,558,873 | B1 | 5/2003 | Oshima |
| 8,497,332 | B2 | 7/2013 | Kaneko |
| 2015/0197660 | A1 | 7/2015 | Ronne |
| 2018/0215933 | A1 | 8/2018 | Xu |
| 2019/0211219 | A1 | 7/2019 | Kondo et al. |
| 2020/0002556 | A1* | 1/2020 | Sato ................. C08F 212/08 |
| 2020/0048480 | A1 | 2/2020 | Yoshitomi et al. |
| 2021/0024762 | A1* | 1/2021 | Nakashima .......... C08F 236/22 |

FOREIGN PATENT DOCUMENTS

| | | |
|---|---|---|
| CN | 102264849 A | 11/2011 |
| CN | 110431198 A | 11/2019 |
| JP | 2004040585 | 2/2004 |
| JP | 2019-143057 A | 8/2019 |
| TW | 1483955 B | 5/2015 |
| TW | 1650611 B | 2/2019 |
| WO | 2019188569 A1 | 10/2019 |
| WO | WO-2019188569 A1 * | 10/2019 ............. C09D 11/36 |

* cited by examiner

Primary Examiner — Robert S Walters, Jr.
(74) Attorney, Agent, or Firm — Abel Schillinger, LLP

(57) ABSTRACT

A photocurable composition can comprise a polymerizable material and an initiator. The polymerizable material can include at least one first multi-functional monomer containing an allyloxymethyl methacrylate structure in an amount at least 5 wt % and not greater than 20 wt % based on the polymerizable material. The photocurable composition can be suitable for use in inkjet adaptive planarization and may be adapted to form cured layers having a glass transition temperature of at least 120° C.

18 Claims, No Drawings

PHOTOCURABLE COMPOSITION

FIELD OF THE DISCLOSURE

The present disclosure relates to a photocurable composition, particularly to a photocurable composition for inkjet adaptive planarization including a monomer comprising an allyloxymethyl acrylate structure.

BACKGROUND

Inkjet Adaptive Planarization (IAP) is a process which planarizes a surface of a substrate, e.g., a wafer containing an electronic circuit, by jetting liquid drops of a curable composition on the surface of the substrate, and bringing a flat superstrate in direct contact with the added liquid to form a flat liquid layer. The flat liquid layer is typically solidified under UV light exposure, and after removal of the superstrate a planar surface is obtained which can be subjected to subsequent processing steps, for example baking, etching, and/or further deposition steps. There exists a need for improved IAP materials leading to planar cured layers with a high glass transition temperature and improved dry etch performance.

SUMMARY

In one embodiment, a photocurable composition can comprise a polymerizable material and a photo-initiator, wherein the polymerizable material can comprise at least one multi-functional monomer of Formula (1) in an amount of at least 5 wt % and not greater than 20 wt % based on the total weight of the polymerizable material,

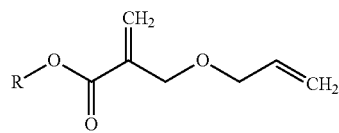
(1)

with R being $C_1$-$C_6$ alkyl, alkyl-aryl, or aryl,
and wherein the composition can be adapted for forming a cured layer having a glass transition temperature of at least 120° C.

In one aspect, the amount of the at least one first multi-functional monomer may be not greater than 15 wt % based on the total weight of the polymerizable material.

In another certain aspect, the amount of the at least one first multi-functional monomer may be not greater than 10 wt % based on the total weight of the polymerizable material.

In another certain aspect, R of the monomer of Formula (1) can include methyl or benzyl.

In a further aspect, a viscosity of the photocurable composition can be not greater than 15 mPa·s.

In another aspect, an amount of the polymerizable material of the photocurable composition can be at least 95 wt % based on the total weight of the photocurable composition.

In one aspect, the polymerizable material can further comprise at least one second multi-functional monomer different than the at least one first multi-functional monomer, and at least one mono-functional monomer.

In a particular aspect, an amount of the at least one second multi-functional monomer can be at least 15 wt % and not greater than 50 wt % based on the total weight of the polymerizable material.

In a certain aspect, the at least one second multi-functional monomer of the polymerizable material can include bisphenol-A-dimethacrylate.

In a further aspect, the at least one mono-functional monomer of the polymerizable material can include a mono-functional acrylate monomer. In certain aspects, the mono-functional acrylate monomer can include benzyl acrylate (BA), benzyl methacrylate (BMA), 1-naphthyl acrylate (1-NA), 1-naphthyl methacrylate (1-NMA), or any combination thereof.

In one aspect of the curable composition, a weight percent ratio of the at least one first multi-functional monomer to the at least one second multi-functional monomer of the polymerizable material can range from 1:2 to 1:4.

In a particular aspect, the photocurable composition of the present disclosure can be adapted for forming a planar layer in an inkjet-based adaptive planarization process.

In one embodiment, a laminate can comprise a substrate and a photo-cured layer overlying the substrate, wherein the photo-cured layer can be formed from the photocurable composition of the present disclosure described above.

In one aspect, the photo-cured layer of the laminate can have a glass transition temperature of at least 120° C.

In another embodiment, a method of forming a photo-cured layer on a substrate can comprise: applying a photocurable composition on a substrate, wherein the photocurable composition may comprise a polymerizable material and a photo-initiator, wherein the polymerizable material comprises at least one first multi-functional monomer of Formula (1) in an amount of at least 5 wt % and not greater than 20 wt % based on the total weight of the polymerizable material

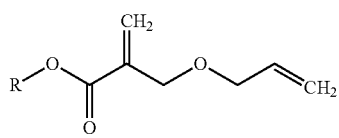
(1)

with R being $C_1$-$C_6$-alkyl, alkyl-aryl, or aryl;
bringing the photocurable composition into contact with a superstrate;
irradiating the photocurable composition with light to form a photo-cured layer, wherein the photo-cured layer may have a glass-transition temperature of at least 120° C.; and
removing the superstrate from the photo-cured layer.

In one aspect of the method, a viscosity of the photocurable composition may be not greater than 15 mPa·s.

In another aspect of the method, an amount of the at least one first multi-functional monomer of Formula (1) can be not greater than 15 wt % based on the total weight of the polymerizable material.

The yet a further aspect of the method, the photo-cured layer can have a glass-transition temperature of at least 120° C.

In a further embodiment, a method of manufacturing an article can comprise: applying a photocurable composition on a substrate, wherein the photocurable composition may comprise a polymerizable material and a photo-initiator, wherein the polymerizable material comprises at least one first multi-functional monomer of Formula (1) in an amount of at least 5 wt % and not greater than 20 wt % based on the total weight of the polymerizable material

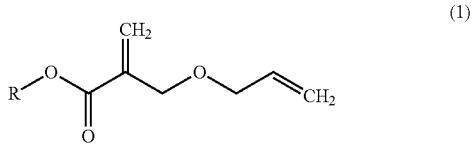

(1)

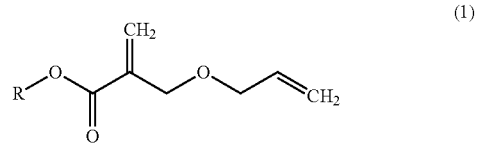

(1)

with R being C1-C6 alkyl, alkyl-aryl, or aryl;

bringing the photocurable composition into contact with a superstrate;

irradiating the photocurable composition with light to form a photo-cured layer, wherein the photo-cured layer can have a glass transition temperature of at least 120° C.;

removing the superstrate from the photo-cured layer; and processing the substrate with the photo-cured layer to make the article.

DETAILED DESCRIPTION

The following description is provided to assist in understanding the teachings disclosed herein and will focus on specific implementations and embodiments of the teachings. This focus is provided to assist in describing the teachings and should not be interpreted as a limitation on the scope or applicability of the teachings.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the imprint and lithography arts.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The present disclosure is directed to a photocurable composition comprising a polymerizable material and a photo-initiator, wherein the polymerizable material can comprise at least one first multi-functional monomer of Formula (1), with R being $C_1$-$C_6$ alkyl, alkyl-aryl, or aryl. In a particular aspect, R can be methyl or benzyl.

The multi-functional monomer of Formula (1) can polymerize during UV exposure by forming a five-membered tetrahydrofuran ring in the polymer backbone. As used herein, the monomer of Formula (1) is also described interchangeable as "at least one first multi-functional monomer" to distinguish from an "at least one second multi-functional monomer" not falling under the structure of Formula (1). As used herein, multi-functional monomer is understood as a monomer having at least two functional groups which can be involved in polymerization reactions.

It has been surprisingly discovered that a minor amount of the at least one first multi-functional monomer of Formula (1), such as at least 5 wt % to not greater than 20 wt % based on the total weight of the polymerizable material, can lead to a photocurable composition which can form a cured layer having a glass transition temperature of at least 120° C.

In a certain aspect, an amount of the at least one first multi-functional monomer of the photocurable composition may be not greater than 18 wt %, or not greater than 15 wt %, or not greater than 12 wt %, or not greater than 10 wt % and can achieve a glass transition temperature of at least 120° C. of a corresponding cured coating layer.

In another embodiment, an increase of the amount of the at least one first multi-functional monomer to at least 45 wt % based on the total weight of the polymerizable material can lead to a photo cured layer having a glass transition temperature of at least 140° C., or at least 145° C.

In one embodiment, the photocurable composition can be adapted having a low viscosity, which can make the composition suitable for forming a planar layer in an inkjet-based planarization process. In one aspect, the viscosity of the photocurable composition can be not greater than 15 mPa·s, such as not greater than 12 mPa·s, or not greater than 10 mPa·s, or not greater than 8 mPa·s. In another aspect, the viscosity can be at least 3 mPa·s, or at least 5 mPa·s, or at least 7 mPa·s. The viscosity can be a value between any of the upper and lower values cited above. As used herein, all viscosity values relate to viscosities measured at a temperature of 23° C. with the Brookfield method.

The polymerizable material may be the majority amount the photocurable composition. In embodiments, an amount of the polymerizable material can be at least 80 wt % based on the total weight of the photocurable composition, such as at least 85 wt %, or at least 90 wt %, or at least 95 wt %. In another aspect, the amount of the polymerizable material can be not greater than 99 wt % based on the total weight of the curable composition, or not greater than 98 wt %, or not greater than 97 wt %, or not greater than 95 wt %, or not greater than 93 wt %, or not greater than 90 wt %. In a certain particular aspect, the amount of the polymerizable material can be at least 95 wt % based on the total weight of the curable composition.

The polymerizable material can include next to the at least one first multi-functional monomer of Formula (1) other polymerizable monomers, oligomers and/or polymers. In one embodiment, the polymerizable material can include at least one second multi-functional monomer which is different than the at least one first multi-functional monomer of Formula (1), and at least one mono-functional monomer. In a particular aspect, the at least one second multi-functional monomer can be a bi-functional monomer, a tri-functional monomer, or a tetra-functional monomer. In a particular aspect, multi-functional monomer may be a bi-functional acrylate monomer. In a certain particular aspect, the bi-functional acrylate monomer can include bisphenol-A-di-methacrylate. In other non-limiting examples of the at least one second multi-functional monomers can be a bi-functional monomer and include, hydroxyphenyl-4-hydroxybenzoate diacrylate, bis(4-methacryloyloxyphenyl)ketone, or any combination thereof.

An amount of the at least one second multi-functional monomer can be at least 15 wt % based on the total weight of the polymerizable material, such as at least 20 wt %, or at least 25 wt %, or at least 30 wt %. In another aspect, the at least one second multi-functional monomer may be not greater than 50 wt % based on the total weight of the polymerizable material, such as not greater than 45 wt %, not greater than 40 wt %, or not greater than 35 wt % based on the total weight of the polymerizable material.

In one aspect, the at least one mono-functional monomer of the polymerizable material can include a mono-functional acrylate monomer. As used herein, the term mono-functional acrylate monomer relates to any monomer structure including one acrylate unit or one substituted acrylate unit, for example a methacrylate unit. Non-limiting examples of acrylate monomers can be benzyl acrylate (BA); 1-naphthyl acrylate (1-NA); benzyl methacrylate (BMA); or 1-naphthyl methacrylate (1-NMA); or tetrahydrofurfuryl acrylate, isobornyl acrylate, or dicyclopentanyl acrylate, pentafluorobenzyl acrylate, 1-adamantyl methacrylate, 2-adamantyl acrylate, or trimethyl cyclohexyl acrylate, or any combination thereof. In one particular aspect, the composition can include at least two acrylate monomers selected from benzyl acrylate (BA), benzyl methacrylate (BMA), 1-naphthyl acrylate (1-NA), and 1-naphthyl methacrylate (1-NMA).

The amount of the at least one mono-functional monomer can be at least 25 wt % based on the total weight of the polymerizable material, such as at least 30 wt %, or at least 40 wt %, or at least 50 wt %. In another aspect, the amount of the mono-functional monomer may be not greater than 60 wt % based on the total weight of the polymerizable material, or not greater than 55 wt %, or not greater than 50 wt %, or not greater than 45 wt %, or not greater than 40 wt %. The amount of the mono-functional monomer can be within a range including any of the minimum and maximum values noted above.

In a further aspect, the photocurable composition of the present disclosure may be free of a solvent, and the at least one first multi-functional monomer of Formula (1) can be dissolved in the mono-functional acrylate monomer.

In one aspect, a weight percent ratio of the at least one multi-functional monomer of Formula (1) to the at least one second multi-functional monomer can be not greater than 0.5, or not greater than 0.4, or not greater than 0.3, or not greater than 0.25. In a further aspect, the weight percent ratio may be at least 0.1 or at least 0.15 or at least 0.2. The weight percent ratio of the at least one first multi-functional monomer to the at least one second multi-functional monomer can be a value between any of the maximum and minimum values noted above.

In order to initiate the photo curing of the composition if exposed to light, one or more photo-initiators can be included in the photocurable composition. Non-limiting examples of photo-initiators can be, for example, Irgacure 819, Irgacure 651, Irgacure 1173, or Irgacure 2959.

In a further aspect, the photocurable composition can contain at least one optional additive. Non-limiting examples of optional additives can be a surfactant, a dispersant, a stabilizer, a co-solvent, an initiator, an inhibitor, a dye, or any combination thereof.

In another embodiment of the present disclosure, a laminate can comprise a substrate and a photo-cured layer overlying the substrate, wherein the photo-cured layer may be formed from the photocurable composition described in the embodiments above. The substrate is not limited to a specific material. In a particular certain aspect, the substrate can be a patterned silicon wafer.

In one aspect, the photo-cured layer of the laminate can have a glass transition temperature of at least 120° C., such as at least 125° C., at least 128° C., or at least 130° C.

In another aspect, a thickness of the photo-cured layer within the laminate can be at least 80 nm, or at least 100 nm, or at least 200 nm. In a further aspect, the thickness of the photo-cured layer may be not greater than 2000 nm, or not greater than 1000 nm, or not greater than 500 nm.

In a certain aspect, the laminate can include one or more layers between the substrate and the photo cured layer, for example an adhesion layer.

The present disclosure is further directed to a method of forming a photo-cured layer on a substrate. The method can comprise applying the photocurable composition described above over a substrate; bringing the photocurable composition into contact with a superstrate; irradiating the photocurable composition with light to form the photo-cured layer; and removing the superstrate from the photo-cured layer.

In one aspect, the light irradiation can be conducted with light having wavelength between 250 nm to 760 nm. In a preferred aspect, the light irradiation may be conducted with light having a wavelength between 300 nm and 450 nm.

The substrate and the solidified (photo cured) layer may be subjected to additional processing to form a desired article, for example, by including an etching process to transfer an image into the substrate that corresponds to the pattern in one or both of the solidified layer and/or patterned layers that are underneath the solidified layer. The substrate can be further subjected to known steps and processes for device (article) fabrication, including, for example, curing, oxidation, layer formation, deposition, doping, planarization, etching, formable material removal, dicing, bonding, and packaging, and the like. In a certain aspect, the substrate may be processed to produce a plurality of articles (devices).

The cured layer may be further used as an interlayer insulating film of a semiconductor device, such as LSI, system LSI, DRAM, SDRAM, RDRAM, or D-RDRAM, or as a resist film used in a semiconductor manufacturing process.

As further demonstrated in the examples, it has been surprisingly discovered that certain combinations polymerizable monomers including a certain amount of the monomer of Formula (1) can have very suitable properties especially for IAP processing. The photocurable composition of the present disclosure can have a desired low viscosity of not greater than 15 mPa·s and can form photo-cured layers having a glass transition temperature of at least 120° C.

EXAMPLES

The following non-limiting examples illustrate the concepts as described herein.

Example 1

Preparing of photocurable IAP compositions.

Photocurable compositions (samples 1-8) were prepared with varying amounts of multi-functional monomers falling under Formula (1), such as methyl 2-(allyloxymethyl) acrylate (CAS 219828-90-7, herein also called AMA 1), and benzyl α-(allyloxymethyl) acrylate (CAS 1233368-5-6, herein also called AMA 2). The photocurable compositions further contained as a second multi-functional monomer the bi-functional monomer bisphenyl A dimethacrylate (BPADMA), and as mono-functional acrylate monomers benzyl acrylate (BA) and 1-naphthyl acrylate (1-NA). Each composition further contained 3 wt % of photo-initiator Irgacure 819 and 1 wt % of a surfactant based on the total weight of the composition. The total amount of the polymerizable material was for each composition (samples 1-8) 97 wt % based on the total weight of the photocurable composition.

The exact weight % amounts of each monomer type based on the total weight of polymerizable material is shown in Table 1.

Photocuring was conducted after applying a liquid film of the photocurable composition of about 3 microns thickness on a glass substrate, and subjecting the liquid film to a UV light intensity of 20 mW/cm$^2$ and curing it for 120 seconds, which corresponds to a curing energy dosage of 2.4 J/cm$^2$.

Of each photo cured layer, the glass transition temperature (Tg) was measured, which are also listed in Table 1.

Table 1 also includes one sample (sample 8), which did not contain a monomer falling under Formula (1) in the polymerizable material, and was a commercial IAP resist material including BPADMA, BA, and 1-NA. A photo cured layer of the composition of sample 8 had the lowest glass transition temperature with 90° C. A further comparative example (sample 9) was prepared by changing the second multi-functional monomer from bisphenol A dimethacrylate (BPADMA) to bisphenol A diacrylate (BPADA). Sample 9 was the same composition as sample 6 (see Table 1), except that the 20 wt % BPADMA was replaced with 20 wt % BPADA. The viscosity of sample 9 was 7.35 mPa s and the measured glass transition temperature of a cured layer made from sample 9 was 119° C. The comparison of sample 9 and sample 6 shows that the second multi-functional monomer may differ in the desired synergistic effect in combination with the allyloxymethyl acrylate monomer of Formula (1). Furthermore, although the amount of AMA 1 in sample 9 was 30 wt %, the glass transition temperature of the cured layer was 10° C. lower in comparison to Sample 1 using only 10 wt % AMA1.

The viscosity of all samples was below 15 mPa·s. The viscosity was measured for each sample at 23° C., using a Brookfield Viscometer LVDV-II+Pro at 200 rpm, with a spindle size #18. For the viscosity testing, about 6-7 mL of sample liquid was added into the sample chamber, enough to cover the spindle head. For all viscosity testing, at least three measurements were conducted and an average value was calculated.

The storage modulus and glass transition temperature were measured with an Anton-Paar MCR-301 rheometer coupled with a Hamamatsu Lightningcure LC8 UV source. The sample was radiated with a UV intensity of 1.0 mW/cm$^2$

TABLE 1

| Sample | AMA 1 [wt %] | AMA 2 [wt %] | BPADMA [wt %] | BA [wt %] | 1-NA [wt %] | Viscosity [mPa · s] | Tg [° C.] |
|---|---|---|---|---|---|---|---|
| 1 | 10 |    | 30 | 40 | 20 | 10.0  | 129 |
| 2 |    | 10 | 30 | 40 | 20 | 12.87 | 121 |
| 3 | 10 |    | 30 | 55 | 5  | 6.90  | 122 |
| 4 |    | 10 | 30 | 55 | 5  | 8.55  | 114 |
| 5 | 10 |    | 20 | 40 | 30 | 8.27  | 109 |
| 6 | 30 |    | 20 | 20 | 30 | 7.56  | 130 |
| 7 | 50 |    | 20 |    | 30 | 6.62  | 145 |
| 8 |    |    | 20 | 50 | 30 | 8.10  | 90  |

It can be seen from the data in Table 1 that it was possible to achieve with an amount of only 10 wt % of the multi-functional monomer of Formula (1) (AMA 1 or AMA 2) based on the total amount of polymerizable material a glass transition temperature of greater than 120° C., see samples 1, 2, and 3.

Comparing AMA 1 and AMA 2, the inclusion of AMA 1 lead to an about 6% higher glass transition temperature than the inclusion of AMA 2 under otherwise same conditions.

It was further of advantage for achieving a high glass transition temperature to increase the amount of BPADMA in the curable composition, the second multi-functional monomer. An increase of BPADMA from 20 wt % to 30 wt %, by keeping constant the amount of AMA 1, caused an increase in glass transition temperature from 109° C. to 122° C., compare samples 5 and 3.

Increasing the amount of AMA 1 monomer up to 50 wt % lead to a further large increase of the glass transition temperature to 145° C. (sample 7).

at 365 nm controlled by a Hamamatsu 365 nm UV power meter. Software named RheoPlus was used to control the rheometer and to conduct the data analysis. The temperature was controlled by a Julabo F25-ME water unit and set to 23° C. as starting temperature. For each sample testing, 7 μl resist sample was added onto a glass plate positioned directly underneath the measuring system of the rheometer. Before starting with the UV radiation, the distance between glass plate and measuring unit was reduced to a gap of 0.1 mm. The UV radiation exposure was continued until the storage modulus reached a plateau, and the height of the plateau was recorded as the storage modulus listed in Table 3.

After the UV curing was completed, the temperature of the cured sample was increased by controlled heating to measure the change of the storage modulus in dependency to the temperature to obtain the glass transition temperature $T_g$. As glass transition temperature $T_g$ was considered the temperature corresponding to the maximal value of Tangent (θ).

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any sub combination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A photocurable composition comprising a polymerizable material and a photo-initiator, wherein the polymerizable material comprises at least one first multi-functional monomer of Formula (1) in an amount of at least 5 wt % and not greater than 20 wt % based on the total weight of the polymerizable material,

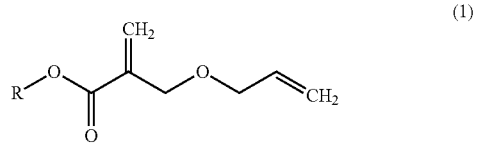

(1)

with R being $C_1$-$C_6$ alkyl, alkyl-aryl, or aryl;
at least one second multi-functional acrylate monomer in an amount of at least 25 wt % based on the total weight of the polymerizable material, and at least one mono-functional acrylate monomer in an amount of at least 50 wt % based on the total weight of the polymerizable material;
an amount of the polymerizable material is at least 95 wt % based on the total weight of the photocurable composition; and wherein the photocurable composition is adapted for forming a cured layer having a glass transition temperature of at least 120° C.

2. The photocurable composition of claim 1, wherein the amount of the at least one first multi-functional monomer is not greater than 15 wt % based on the total weight of the polymerizable material.

3. The photocurable composition of claim 2, wherein the amount of the at least one first multi-functional monomer is not greater than 10 wt % based on the total weight of the polymerizable material.

4. The photocurable composition of claim 1, wherein R of Formula (1) includes methyl or benzyl.

5. The photocurable composition of claim 1, wherein a viscosity of the photocurable composition is not greater than 15 mPa·s.

6. The photocurable composition of claim 1, wherein the at least one second multi-functional monomer includes bisphenol-A-dimethacrylate.

7. The photocurable composition of claim 1, wherein the at least one mono-functional acrylate monomer includes benzyl acrylate (BA), benzyl methacrylate (BMA), 1-naphthyl acrylate (1-NA), 1-naphthyl methacrylate (1-NMA), or any combination thereof.

8. The photocurable composition of claim 1, wherein a weight percent ratio of the at least one first multi-functional monomer to the at least one second multi-functional monomer is not greater than 0.4.

9. The photocurable composition of claim 1, wherein the composition is adapted for forming a planar layer in an inkjet-based adaptive planarization process.

10. The photocurable composition of claim 1, wherein an amount of the at least one second multi-functional monomer is at least 30 wt % based on the total weight of the polymerizable material.

11. The photocurable composition of claim 1, wherein the photocurable composition is free of pigments.

12. A laminate comprising a substrate and a photo-cured layer overlying the substrate, wherein the photo-cured layer is formed from the photocurable composition of claim 1.

13. The laminate of claim 12, wherein the photo-cured layer has a glass transition temperature of at least 120° C.

14. A method of forming a photo-cured layer on a substrate, comprising:
applying a photocurable composition on a substrate, wherein the photocurable composition comprises a polymerizable material and a photo-initiator, wherein the polymerizable material comprises at least one first multi-functional monomer of Formula (1) in an amount at least 5 wt % and not greater than 20 wt % based on the total weight of the polymerizable material

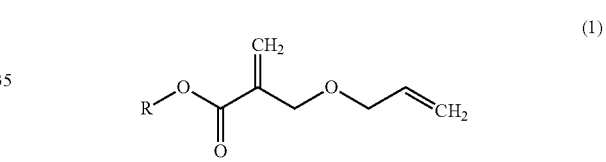

(1)

with R being $C_1$-$C_6$-alkyl, alkyl-aryl, or aryl,
at least one second multi-functional acrylate monomer in an amount of at least 25 wt % based on the total weight of the polymerizable material, at least one mono-functional acrylate monomer in an amount of at least 50 wt % based on the total weight of the polymerizable material, and an amount of the polymerizable material is at least 95 wt % based on the total weight of the photocurable composition;
bringing the photocurable composition into contact with a superstrate;
irradiating the photocurable composition with light to form a photo-cured layer, wherein the photo-cured layer has a glass-transition temperature of at least 120° C.; and
removing the superstrate from the photo-cured layer.

15. The method of claim 14, wherein a viscosity of the photocurable composition is not greater than 15 mPa·s.

16. The method of claim 14, wherein an amount of the at least one first multi-functional monomer is not greater than 15 wt % based on the total weight of the polymerizable material.

17. The method of claim 14, wherein the photo-cured layer has a glass-transition temperature of at least 125° C.

18. A method of manufacturing an article, comprising:
applying a photocurable composition on a substrate, wherein the photocurable composition comprises a polymerizable material and a photo-initiator, wherein the polymerizable material comprises at least one first multi-functional monomer of Formula (1) in an amount of at least 5wt % and not greater than 20 wt % based on the total weight of the polymerizable material

with R being $C_1$-$C_6$ alkyl, alkyl-aryl, or aryl, at least one second multi-functional acrylate monomer in an amount of at least 25 wt % based on the total weight of the polymerizable material, at least one mono-functional acrylate monomer in an amount of at least 50 wt % based on the total weight of the polymerizable material, and an amount of the polymerizable material is at least 95 wt % based on the total weight of the photocurable composition;

bringing the photocurable composition into contact with a superstrate;

irradiating the photocurable composition with light to form a photo-cured layer, wherein the photo-cured layer has a glass transition temperature of at least 120° C.;

removing the superstrate from the photo-cured layer; and processing the substrate with the photo-cured layer to make the article.

* * * * *